(12) United States Patent
Nagano et al.

(10) Patent No.: US 9,486,734 B2
(45) Date of Patent: Nov. 8, 2016

(54) HELIUM GAS SEPARATOR MATERIAL AND METHOD FOR PRODUCING THE SAME

(71) Applicants: Japan Petroleum Exploration Co., Ltd., Tokyo (JP); Japan Fine Ceramics Center, Aichi (JP)

(72) Inventors: Takayuki Nagano, Nagoya (JP); Koji Sato, Nagoya (JP); Kazumoto Chiba, Ichihara (JP); Toshiya Wakatsuki, Funabashi (JP); Yusuke Takeuchi, Akita (JP)

(73) Assignees: Japan Petroleum Exploration Co., Ltd., Tokyo (JP); Japan Fine Ceramics Center, Aichi (JP)

( * ) Notice: Subject to any disclaimer, the term of this patent is extended or adjusted under 35 U.S.C. 154(b) by 0 days.

(21) Appl. No.: 14/410,921

(22) PCT Filed: Jun. 27, 2013

(86) PCT No.: PCT/JP2013/067672
§ 371 (c)(1),
(2) Date: Dec. 23, 2014

(87) PCT Pub. No.: WO2014/007140
PCT Pub. Date: Jan. 9, 2014

(65) Prior Publication Data
US 2015/0151242 A1      Jun. 4, 2015

(30) Foreign Application Priority Data

Jul. 3, 2012   (JP) ................................. 2012-149846

(51) Int. Cl.
*B01D 53/22*         (2006.01)
*B01D 67/00*         (2006.01)
(Continued)

(52) U.S. Cl.
CPC .......... *B01D 53/228* (2013.01); *B01D 67/0072* (2013.01); *B01D 69/12* (2013.01);
(Continued)

(58) Field of Classification Search
CPC .......... B01D 53/228; B01D 2053/221; B01D 67/0072; B01D 69/12; B01D 71/02; B01D 71/024; B01D 71/025; B01D 71/027; B01D 2256/18; B01D 2323/12; B01D 2325/02; C01B 23/0047; C01B 2210/0031; C01B 2210/007; C04B 35/10; C04B 41/85; C04B 41/87
USPC ............................................................ 95/53
See application file for complete search history.

(56) References Cited

U.S. PATENT DOCUMENTS 5,632,803 A * 5/1997 Stoner .................... B01D 53/04
                                                                      95/53
5,782,959 A    7/1998 Yang et al.
(Continued)

FOREIGN PATENT DOCUMENTS

CA        2650680 A1    11/2007
CN      101432061 A     5/2009
(Continued)

OTHER PUBLICATIONS

Nagano, Takayuri et al., "Hydrothermal stability of mesoporous Ni-doped gamma-Al2O3", Journal of the Ceramic Society of Japan, 2009, vol. 117, No. 7, pp. 832-835.*
(Continued)

*Primary Examiner* — Jason M Greene
(74) *Attorney, Agent, or Firm* — Panitch Schwarze Belisario & Nadel LLP

(57) ABSTRACT

The helium gas separator material includes a base portion and a gas separation portion joined to the base portion. The base portion is composed of a porous α-alumina material which has communication holes with an average diameter of 50 nm to 1,000 nm; the gas separation portion has a porous γ-alumina portion containing a Ni element and a silica membrane portion which is disposed on the inner wall of the communication holes in the porous portion; and the average diameter of pores surrounded and formed by the silica membrane portion is 0.27 nm to 0.60 nm.

9 Claims, 6 Drawing Sheets

(51) Int. Cl.
- *B01D 71/02* (2006.01)
- *B01D 69/12* (2006.01)
- *C04B 41/85* (2006.01)
- *C04B 41/87* (2006.01)
- *C04B 35/10* (2006.01)
- *C01B 23/00* (2006.01)

(52) U.S. Cl.
CPC ......... *B01D 71/025* (2013.01); *B01D 71/027* (2013.01); *C01B 23/0047* (2013.01); *C04B 35/10* (2013.01); *C04B 41/85* (2013.01); *C04B 41/87* (2013.01); *B01D 2053/221* (2013.01); *B01D 2256/18* (2013.01); *B01D 2323/12* (2013.01); *B01D 2325/02* (2013.01); *C01B 2210/007* (2013.01); *C01B 2210/0031* (2013.01)

(56) References Cited

U.S. PATENT DOCUMENTS

| | | | | |
|---|---|---|---|---|
| 7,179,325 | B2* | 2/2007 | Oyama | B01D 53/228 96/11 |
| 2002/0142172 | A1* | 10/2002 | Brinker | B01D 71/027 428/446 |
| 2003/0222015 | A1* | 12/2003 | Oyama | B01D 53/228 210/500.21 |
| 2004/0038044 | A1* | 2/2004 | Ruldolph | B01D 71/027 428/446 |
| 2008/0134895 | A1* | 6/2008 | Ruud | B01D 53/228 96/9 |
| 2011/0197762 | A1* | 8/2011 | Voss | B01D 71/027 96/11 |
| 2013/0112078 | A1* | 5/2013 | Takagi | B01D 71/027 96/11 |

FOREIGN PATENT DOCUMENTS

| | | | |
|---|---|---|---|
| JP | 2002253919 | A | 9/2002 |
| JP | 2003-053167 | A | 2/2003 |
| JP | 2005-074317 | A | 3/2005 |
| JP | 2007-137752 | A | 6/2007 |
| JP | 2007-216106 | * | 8/2007 |
| JP | 2007-216106 | A | 8/2007 |
| JP | 2010-005602 | A | 1/2010 |

OTHER PUBLICATIONS

English language machine translation of JP 2007-216106, retrieved from http://translationportal.epo.org on Dec. 8, 2015.*

Nagano, Takayuki et al., Hydrothermal stability of mesoporous Ni-doped y-Al2O3, Journal of the Ceramic Society of Japan, vol. 117, No. 7, p. 832-835 (2009).

Int'l Search report issued on Aug. 20, 2013 in Int'l Application No. PCT/JP2013/067672.

Search Report (with English translation) and Office Action issued Sep. 25, 2015 in CN Application No. 201380033821.9.

Office Action issued Mar. 29, 2016 in EP Application No. 13812948.1.

Tsuru et al., "A Bimodal Catalytic Membrane having a Hydrogen-Permselective Silica Layer on a Bimodal Catalytic Support:Preparation and Application to the Steam Reforming of Methane", Applied Catalysis A: General; vol. 302, No. 1, pp. 78-85 (Mar. 2006).

Tsuru et al., "Development of Metal-doped Silica Membranes for Increased Hydrothermal Stability and Their Applications to Membrane Reactors for Steam Reforming of Methane", Joural of Japan Petroleum Institute, vol. 54, No. 5, pp. 277-286 (Jan. 2011).

Nomura et al., "Preparation of a Catalyst Composite Silica Membrane Reactor for Steam Reforming Reaction by Using a Counterdiffusion CVD Method", Industrial & Engineering Chemistry Research, vol. 45, No. 11, pp. 3950-3954 (May 2006).

* cited by examiner

HELIUM GAS SEPARATOR MATERIAL AND METHOD FOR PRODUCING THE SAME

CROSS-REFERENCE TO RELATED APPLICATION

This application is a Section 371 of International Application No. PCT/JP2013/067672, filed Jun. 27, 2013, which was published in the Japanese language on Jan. 9, 2014, under International Publication No. WO 2014/007140 A1, and the disclosures of which are incorporated herein by reference.

TECHNICAL FIELD

The present invention relates to a helium gas separator material which exhibits excellent helium gas permeability and heat resistance under conditions of the temperature range from 0° C. to 300° C. and a gauge pressure exceeding 0.1 MPa, and a method for producing the helium gas separator material.

Priority is claimed on Japanese Patent Application No. 2012-149846, filed Jul. 3, 2012, the content of which is incorporated herein by reference.

BACKGROUND ART

In recent years, a material (separator membrane), which selectively separates helium gas from mixed gas containing helium gas having a small molecular diameter, and the selective separation method have been examined.

As the helium gas separator material, a separator membrane composed of a polymer is known. Patent Document 1 discloses a gas separator membrane composed of a carbon membrane containing silver or copper. Patent Document 2 discloses a polymeric gas separator membrane obtained by performing hydrolysis and polycondensation of a composition composed of a polyether copolymer having a specific structure and a polyfunctional alkoxysilane such as tetraalkoxysilane or trialkoxysilane. Furthermore, Patent Document 3 discloses a helium gas separator material including an α-alumina substrate that has communication holes, a silica membrane that covers the surface of the α-alumina substrate, and a silicon carbide membrane that comes into contact with the inside of the communication holes on the surface of the SiOC membrane.

CITATION LIST

Patent Document

[Patent Document 1] Japanese Unexamined Patent Application, First Publication No. 2003-53167
[Patent Document 2] Japanese Unexamined Patent Application, First Publication No. 2005-74317
[Patent Document 3] Japanese Unexamined Patent Application, First Publication No. 2007-137752

DISCLOSURE OF INVENTION

Technical Problem

The structure of a polymer membrane changes under high-temperature and high-pressure conditions, so the applicability thereof is limited. Therefore, a gas separator material composed of an inorganic material has been examined.

The objects of the present invention are to provide a helium gas separator material which exhibits excellent helium gas permeability under a high pressure condition of a gauge pressure exceeding 0.1 MPa and exhibits excellent heat resistance so as to be usable at a temperature equal to or higher than 150° C., to provide a method for producing the helium gas separator material, and to provide a method for separating helium gas.

Solution to Problem

In order to solve the above problems, the present inventors repeated intensive examination. As a result, they found out that a complex, which includes a porous γ-alumina portion containing a Ni element on the surface of a porous material composed of α-alumina and has a silica membrane portion coming into contact with the inside of communication holes in the porous γ-alumina portion, exhibits excellent helium gas permeability under a high-pressure condition of a gauge pressure exceeding 0.1 MPa and exhibits excellent heat resistance, thereby completing the present invention.

That is, the gist of the present invention is as follows.

1. A helium gas separator material including a base portion and a gas separation portion joined to the base portion, in which the base portion is composed of a porous α-alumina material which has communication holes with an average diameter of 50 nm to 1,000 nm, the gas separation portion has a porous γ-alumina portion containing a Ni element and a silica membrane portion which is disposed on the inner wall of the communication holes in the porous γ-alumina portion containing a Ni element, and the average diameter of pores (hereinafter, also referred to as "fine pores") surrounded and formed by the silica membrane portion is 0.27 nm to 0.60 nm.

2. The helium gas separator material described in 1 that is used under a pressure condition in a range of a gauge pressure exceeding 0.1 MPa and equal to or less than 12 MPa.

3. The helium gas separator material described in 1 or 2, in which the silica membrane portion is disposed at the exposed surface side of the gas separation portion in the inner wall of the communication holes of the porous γ-alumina portion.

4. A method for producing the helium gas separator material described in any one of 1 to 3, including a coating film forming step of forming a coating film by using a composition, which contains an Al component-containing sol and a Ni compound, on the surface of the porous α-alumina material, a thermal treatment step of heating the coating film so as to form a porous γ-alumina membrane containing a Ni element and obtain a complex in which the porous γ-alumina membrane is joined to the surface of the porous α-alumina material, and a silica membrane portion forming step of supplying oxygen element-containing gas from the side of the porous α-alumina material to the side of the porous γ-alumina membrane through the communication holes in the complex in a state where silica precursor gas is present near the surface of the porous γ-alumina membrane in the complex and heating the complex.

5. The method for producing the helium gas separator material described in 4, in which the silica precursor gas is at least one kind selected from a group consisting of tetramethoxysilane, tetraethoxysilane, and hexamethyldisiloxane.

6. The method for producing the helium gas separator material described in 4 or 5, in which the oxygen element-containing gas is oxygen gas or ozone gas.

7. A method for separating helium gas, in which the helium gas separator material described in any one of 1 to 3 is used under a pressure condition in a range of a gauge pressure exceeding 0.1 MPa and equal to or less than 12 MPa so as to separate helium gas and other gases from a mixed gas containing helium gas.

Advantageous Effects of Invention

Being constituted as above, the helium gas separator material of the present invention exhibits excellent helium gas permeability and shape retentivity under a high-pressure condition of a gauge pressure exceeding 0.1 MPa and preferably under a high temperature-condition of 150° C. to 300° C., and has heat resistance.

Furthermore, the method for producing the helium gas separator material of the present invention makes it possible to efficiently produce a helium gas separator material which exhibits excellent helium gas permeability under a high-pressure condition of a gauge pressure exceeding 0.1 MPa and exhibits excellent heat resistance. Particularly, a gas separator membrane portion, of which the membrane thickness has been easily and efficiently controlled, can be formed. As a result, it is possible to efficiently form pores (fine pores) into which at least helium gas permeates.

The helium gas separator material of the present invention can be applied to various uses such as recovery and high-degree purification of helium gas from mixed gas. Moreover, the helium gas separator material is applied to recovering and utilizing other components in the mixed gas. For example, the helium gas separator material of the present invention can be used for separating components of natural gas containing helium gas, hydrocarbon gases and the like, and then the hydrocarbon gases in which the helium gas content has been reduced can be used as fuel or the like. Furthermore, crude helium gas, in which the amount of other gases having a molecular diameter larger than that of helium has been reduced, can be utilized or stored.

BEST MODE FOR CARRYING OUT THE INVENTION

A helium gas separator material of the present invention is constituted with a base portion and a gas separation portion joined to each other. The gas separation portion has a porous γ-alumina portion containing a Ni element (hereinafter, simply referred to as a "porous γ-alumina portion" in some cases) and a silica membrane portion. The base portion is composed of a porous α-alumina material having communication holes with an average diameter of 50 nm to 1,000 nm. The silica membrane portion is disposed on the inner wall of the communication holes in the porous γ-alumina portion. The gas separation portion has pores which are surrounded and formed by the silica membrane portion and have an average diameter of 0.27 nm to 0.60 nm. The communication holes of the base portion are connected to the pores in the gas separation portion, and thus the helium gas separator material exhibits gas permeability from the base portion to the gas separation portion.

When the helium gas separator material of the present invention is used in a high-pressure condition in a range of a gauge pressure exceeding 0.1 MPa and equal to or less than 12 MPa, helium gas is obtained at a high recovery ratio from mixed gas containing helium gas. Although the average diameter (0.27 nm to 0.60 nm) of the pores (fine pores) surrounded and formed by the silica membrane portion is greater than that of helium molecules in some areas, under the aforementioned pressure condition, helium gas preferentially permeates the pores before the gas having a molecular diameter greater than that of helium, such as carbon dioxide gas or nitrogen gas. For instance, such properties are suitably utilized for the use of separating helium gas as a limited resource or crude helium gas (mixed gas containing helium gas as a main component and other small-diameter gases) from natural gas containing hydrocarbon gases useful as fuel gas and helium gas, and then returning the helium gas or the crude helium gas into the ground or recovering it while preventing the gases from being naturally released into the atmosphere.

Figure 1:
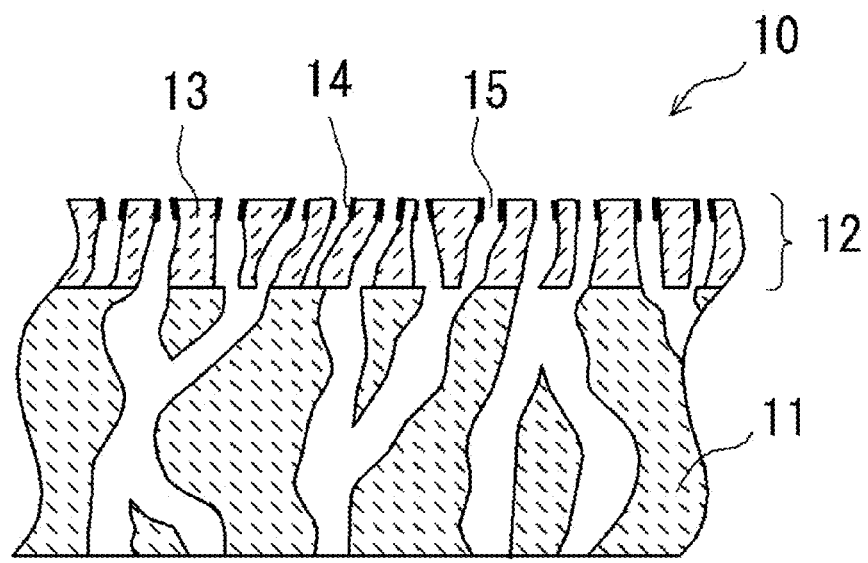
FIG. 1 is a schematic view showing the cross-section of a helium gas separator material of the present invention.

FIG. 1 shows a schematic cross-sectional view of a helium gas separator material 10 of the present invention. That is, the helium gas separator material 10 of FIG. 1 includes a base portion 11 and a gas separation portion 12. The base portion 11 is composed of a porous α-alumina material. The gas separation portion 12 has a porous γ-alumina portion 13 containing a Ni element and a silica membrane portion 14 disposed on the inner wall of a communication hole in the porous portion. Furthermore, a pore (fine pore) 15 surrounded and formed by the silica membrane portion 14 is involved in the separation of helium gas.

The pore (fine pore) 15 is formed in a manner in which the silica membrane portion 14 formed on the inner wall of the communication hole of the porous γ-alumina portion 13 narrows the inner diameter (pore diameter) of the communication hole of the porous γ-alumina portion 13.

The base portion 11 constituting the helium gas separator material 10 of the present invention is composed of a porous α-alumina material, and has a pore that penetrates the base portion from one side to the other side in the form of line or network. That is, the base portion 11 has a communication hole. The structure, shape, size, and the like of the base portion 11 are not particularly limited. The communication hole may be either a single through hole or a plurality of through holes that are regularly or irregularly continuous.

The average diameter of the communication holes is 50 nm to 1,000 nm, preferably 60 nm to 180 nm, and more preferably 80 nm to 150 nm. The average diameter refers to a 50% permeation flux diameter in a pore distribution measured by means of a bubble point method and a half dry method by using a commercially available pore size distribution analyzer.

The shape of the base portion 11 is selected according to the purpose, use, and the like. The base portion 11 can have a lump-like shape (a polyhedron, a sphere, or the like), a plate-like shape (a flat plate, a curved plate, or the like), a cylindrical shape (a round cylinder, a square cylinder, or the like), a semi-cylindrical shape, a rod-like shape, and the like.

Furthermore, the size of the base portion 11 can be selected according to the purpose, use, and the like. Particularly, when it comes to separation of mixed gas, the thickness thereof is preferably equal to or greater than 150 μm.

The shape and size of the helium gas separator material 10 of the present invention is generally the same as the shape and size of the base portion 11.

Figure 2:
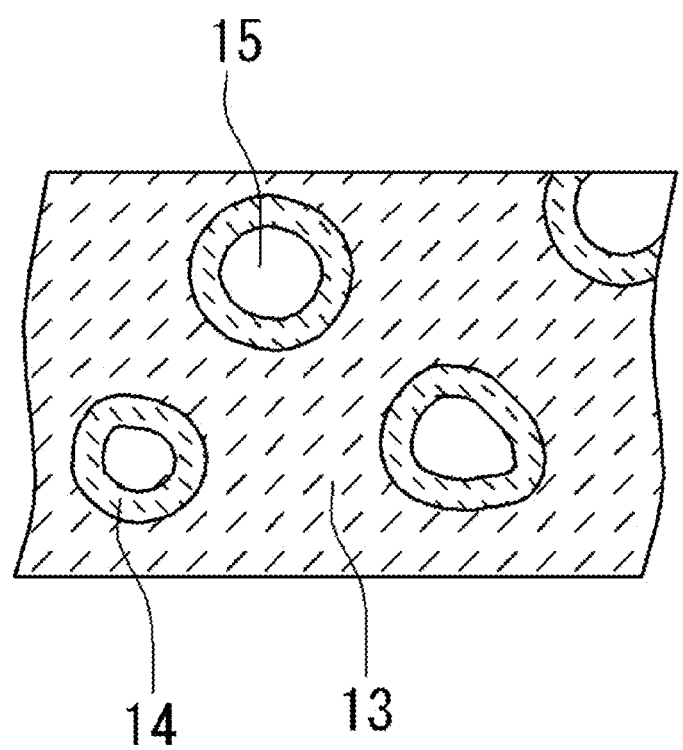
FIG. 2 is a schematic plan view of a gas separation portion of FIG. 1 seen from above.

The gas separation portion 12 is joined to the base portion 11. As shown in FIG. 2, the gas separation portion 12 has the porous γ-alumina portion 13 containing a Ni element, the silica membrane portion 14, and the pore (fine pore) 15.

The porous γ-alumina portion 13 is preferably composed of a porous material in a mixed anionic state in which Ni is dissolved in the form of solid solution in the crystal structure of γ-Al$_2$O$_3$ with a low degree of crystallinity. In this case, the fact that the porous material is composed of a solid solution of oxides can be confirmed by the peak shift and change in a lattice constant resulting from X-ray diffraction (XRD).

From the viewpoint of heat resistance, a ratio between an Al element and a Ni element in the solid solution of oxides that is expressed in terms of Al$_2$O$_3$ and NiO as oxides of Al and Ni is preferably 60 mol % to 99 mol %:1 mol % to 40 mol % (Al$_2$O$_3$:NiO), more preferably 80 mol % to 99 mol %:1 mol % to 20 mol % (Al$_2$O$_3$:NiO), and even more preferably 88 mol % to 98 mol %:2 mol % to 12 mol % (Al$_2$O$_3$:NiO), with respect to a total of 100 mol % of the oxides.

The silica membrane portion 14 is preferably composed of amorphous silica.

The silica membrane portion 14 may be formed all over the inner wall surface of the pore of the porous γ-alumina portion 13 or may be formed on a portion of the inner wall surface of the pore. Herein, "formed in a portion" means that when seen in the cross-sectional view like FIG. 1, the silica membrane portions 14 are formed and positioned at the same depth in the depth direction (cross-sectional direction) of the gas separation portion 12. The "formed in a portion" may mean that the dimension of silica membrane portion 14 is smaller than the dimension of the gas separation portion 12 in the depth direction of the gas separation portion 12.

Because a gas permeation rate is inversely proportional to a membrane thickness, the length of the silica membrane portion 14 in the depth direction (cross-sectional direction) is preferably 50 nm to 500 nm, and more preferably 50 nm to 300 nm.

A compression strength of ceramics is higher than a tensile strength thereof, and accordingly, in the present invention, the silica membrane portion 14 is preferably formed at an exposed surface side of the gas separation portion 12 in the inner wall of the communication hole of the porous γ-alumina portion 13 (see FIG. 1). As a preferable embodiment thereof, the silica membrane portions 14 may be constituted of the same material, and may form a continuous phase together with the membrane disposed on the exposed surface of the gas separation portion 12 (not shown in the drawing). The exposed surface of the gas separation portion 12 is a surface that comes into contact with mixed gas. When the mixed gas comes into contact with the exposed surface of the gas separation portion 12, helium gas contained in the mixed gas permeates the gas separation portion 12 and the base portion 11, and as a result, it is separated from the mixed gas.

The average diameter of the pores (fine pores) 15 surrounded and formed by the silica membrane portion 14 is 0.27 nm to 0.60 nm, preferably 0.27 nm to 0.50 nm, and more preferably 0.27 nm to 0.38 nm.

The thickness of the gas separation portion 12 is substantially the same as the thickness of the porous γ-alumina portion 13 and is selected according to the purpose, use, and the like. The thickness is preferably 1.0 μm to 6.0 μm, and more preferably 2.0 μm to 4.0 μm.

The method for producing the helium gas separator material of the present invention includes a coating film forming step of forming a coating film by using a composition, which contains an Al component-containing sol and a Ni compound, on the surface of the porous α-alumina material, a thermal treatment step of heating the coating film so as to form a porous γ-alumina membrane containing a Ni element and obtain a complex in which the porous γ-alumina membrane is joined to the surface of the porous α-alumina material, and a silica membrane portion forming step of supplying oxygen element-containing gas from the side of the porous α-alumina material to the side of the porous γ-alumina membrane through the communication holes in the complex in a state where silica precursor gas is present near the surface of the porous γ-alumina membrane in the complex and heating the complex, in this order.

First, by the coating film forming step, on the surface of the porous α-alumina material, a coating film is formed by using a composition (hereinafter, referred to as a "sol composition") containing an Al component-containing sol and a Ni compound.

The sol composition may further contain a high-molecular-weight component, water, and the like so as to improve dispersibility, viscosity, and the like.

A ratio between the Al component and the Ni component contained in the sol composition that is expressed in terms of Al$_2$O$_3$ and NiO as oxides of the Al component and the Ni component is preferably 60 mol % to 99 mol %:1 mol % to 40 mol % (Al$_2$O$_3$:NiO), more preferably 80 mol % to 99 mol %:1 mol % to 20 mol % (Al$_2$O$_3$:NiO), and even more preferably 88 mol % to 98 mol %:2 mol % to 12 mol % (Al$_2$O$_3$:NiO), with respect to a total of 100 mol % of the oxides.

Furthermore, the solid content concentration of the sol composition is preferably 5% by mass to 7% by mass, and the pH thereof is preferably 0.5 to 3.5.

The sol composition is generally prepared by mixing the Al component-containing sol, the Ni compound, and the like together such that the concentration of each of the components becomes as described above.

As the Al component-containing sol, a known alumina sol (sol containing an alumina hydrate in the form of colloid particles) is used, and a boehmite sol is preferably used. The boehmite sol is a sol containing a substance represented by molecular formula AlO(OH).

As the boehmite sol, a sol obtained by the following method can be used. That is, first, an aluminum alkoxide such as aluminum isopropoxide, aluminum butoxide, or aluminum tri-sec butoxide is dissolved in a water-soluble organic solvent (isopropanol, ethanol, 2-butanol, 2-methoxyethanol, 2-ethoxyethanol, or the like). Thereafter, the solution is made acidic by using a monovalent acid such as hydrochloric acid, nitric acid, or perchloric acid, and hydrolyzed by being added to hot water at a temperature equal to or higher than 80° C., preferably hot water at 80° C. to 95° C. while being stirred. Generally, the stirring is continued for 1 hour to 20 hours at the aforementioned temperature. Herein, if the temperature of the hot water is low, an amorphous hydrate may be generated.

Next, an alcohol generated (liberated) from the aluminum alkoxide by the hydrolysis is evaporated and removed, whereby a mixture containing boehmite and water is obtained. Subsequently, the aforementioned acid is further added to the mixture, whereby the boehmite sol is prepared. Herein, in order to prevent the aluminum alkoxide having not yet been hydrolyzed from reacting with water, a carboxylic acid anhydride such as acetic anhydride or maleic anhydride; an acetoacetic ester such as methyl acetoacetate, ethyl acetoacetate, or propyl acetoacetate; a dicarboxylic acid ester such as dimethyl malonate, diethyl malonate, or dipropyl malonate; or the like may be premixed with the aluminum alkoxide.

As the Ni compound, any of hydroxides, sulfates, nitrates, and the like containing Ni atoms can be used.

Furthermore, examples of the high-molecular-weight component include a polyvinyl alcohol and modified products thereof, polyvinyl pyrrolidone, polyethylene glycol, polyethylene oxide, an acrylic acid ester copolymer, ammonium polyacrylate, sodium polyacrylate, carboxymethyl cellulose, methyl cellulose, hydroxypropyl methylcellulose, hydroxyethyl cellulose, hydroxypropyl cellulose, carboxymethyl hydroxyethylcellulose, starch and modified products thereof, and the like.

In order to efficiently prepare the sol composition, the boehmite sol obtained by the aforementioned method and/or a commercially available boehmite sol may be mixed with a Ni compound. However, it is preferable to mix the aforementioned mixture immediately before being turn into the boehmite sol with nickel nitrate as the Ni compound that is a compound exhibiting acidity when being dissolved in water. In this way, when the compound exhibiting acidity when being dissolved in water is used, if the respective components described above are mixed together, the mixture becomes acidic. Consequentially, a composition containing a boehmite sol and a Ni component can be obtained. Herein, in preparing the sol composition, the high-molecular-weight component may be mixed thereinto.

Each of the Ni compounds may be used in the form of a solid. Alternatively, either or both of the Ni compounds may be used in the form of a solution by being dissolved in water, an organic solvent, or the like. When a solution is used, an acid or the like is used such that the pH of the sol composition to be prepared falls within the aforementioned preferable range. Likewise, when the high-molecular weight component is mixed thereinto, it may be used alone or used in the form of a solution such that the content thereof falls within a preferable range. The amount of the high-molecular-weight component is preferably 8% by mass to 18% by mass with respect to the total amount of the solid content of the Al component and the Ni component having not yet been mixed together.

The sol composition is coated onto the surface of the porous α-alumina material and forms a coating film along the surface. Examples of the coating method include dip coating, spray coating, spin coating, and the like. Furthermore, the temperature of the sol composition at the time of coating of the sol composition is preferably 10° C. to 35° C., and more preferably 15° C. to 25° C., and the temperature of the porous α-alumina material is preferably 10° C. to 35° C., and more preferably 15° C. to 25° C.

The thickness of the coating film is selected according to the use, and generally is 1 μm to 6 μm.

Herein, the sol composition may enter the pores in some cases because it is coated onto the porous α-alumina material. Accordingly, it is preferable to form the coating film by coating while preventing the sol composition from entering the pores. When the sol composition enters some pores, a solid solution of oxides generated by the following thermal treatment step blocks the communication holes of the porous α-alumina material in some cases.

Subsequently, by the thermal treatment step, a porous γ-alumina membrane containing a Ni element is formed by heating the coating film, whereby a complex in which the porous γ-alumina membrane is joined to the surface of the porous α-alumina material is obtained.

In the thermal treatment step, the coating film is thermally treated in the atmosphere or in an oxygen gas atmosphere under atmospheric pressure at a heating temperature which is preferably 450° C. to 950° C., more preferably 550° C. to 900° C., and even more preferably 600° C. to 850° C. The thermal treatment may be performed at a constant temperature or performed by varying temperature, as long as the temperature is within the above range. Herein, when the heating temperature is too high, the phase transition from γ-Al$_2$O$_3$ to α-Al$_2$O$_3$ may occur in some cases.

If the thermal treatment is performed at the temperature within the above range, the composition is stabilized, and a porous membrane composed of a uniform solid solution of oxides can be obtained. If the temperature is too low, the pore structure tends to become thermally unstable. In contrast, if the temperature is too high, the pore diameter tends to become large. Herein, the heating time, the temperature increase rate, and the like are appropriately selected according to the shape, size, and the like of the porous α-alumina material. However, the heating time is generally 0.5 hours to 10 hours.

After the thermal treatment step, the coating film is slowly cooled such that the surface thereof does not crack.

Each of the coating film forming step and the thermal treatment step may be performed once to form a single-layered porous γ-alumina membrane. Alternatively, each of the steps can be repeated to form a laminate-type porous γ-alumina membrane.

By forming the coating film by using the sol composition and performing the thermal treatment under the aforementioned conditions, it is possible to efficiently form a porous membrane having pores with an average pore diameter equal to or less than 10 nm, preferably 1 nm to 8 nm, more preferably 1 nm to 7 nm, and even more preferably 1 nm to 6 nm. Because the pores of the porous γ-alumina membrane are connected to the pores of the porous α-alumina material, the communication holes are formed in the cross-sectional direction of the complex.

Thereafter, in the silica membrane portion forming step, oxygen element-containing gas is supplied from the side of the porous α-alumina material to the side of the porous γ-alumina membrane through the communication holes in the complex in a state where silica precursor gas is present near the surface of the porous γ-alumina membrane in the complex, and the complex is heated, whereby a silica membrane portion is formed.

The silica membrane portion forming step is preferably performed in a sealed space. In this step, when the complex is heated, in the communication holes of the porous γ-alumina membrane that comes into contact with two kinds of gases, the gases react with each other, whereby a uniform silica membrane portion is formed on the inner wall of the communication holes of the porous γ-alumina membrane.

As the silica precursor gas, a tetraalkoxysilane gas such as tetramethoxysilane or tetraethoxysilane; or a siloxane compound gas such as tetraethyl siloxane, hexamethyl disiloxane, or tetramethyl cyclotetrasiloxane is preferably used.

Furthermore, examples of the oxygen element-containing gas include oxygen gas, ozone gas, and the like.

There is no particular limitation on how to use the silica precursor gas and the oxygen element-containing gas in the silica membrane portion forming step. The silica precursor gas may be caused to stay near the surface of the porous γ-alumina membrane in the complex. Alternatively, the silica precursor gas may be caused to continuously or intermittently flow such that a certain amount of the gas is present near the surface. Furthermore, the oxygen element-containing gas may be continuously or intermittently supplied to the side of the porous γ-alumina membrane from the side of the porous α-alumina material.

When the silica precursor gas come into contact with the oxygen element-containing gas, if the total volume of the gases is regarded as being 100% by volume, the volume ratio between the gases is preferably 20% by volume to 80% by volume:20% by volume to 80% by volume, and more preferably 30% by volume to 70% by volume:30% by volume to 70% by volume, since silica can be smoothly formed by bringing the gases into contact with each other inside the pores of γ-alumina.

The position of the silica membrane portion formed inside the porous γ-alumina membrane and the formability of the silica membrane generally depend on the balance between the flow rate of the silica precursor gas and the flow rate of the oxygen element-containing gas.

The oxygen element-containing gas passes through the communication holes of the complex and flows to the side of the porous γ-alumina membrane. Accordingly, the silica membrane portion is generally positioned on the inner wall of the communication holes of the porous γ-alumina material, and formed at the side of the exposed surface of the porous membrane.

The heating temperature of the complex in the silica membrane portion forming step is preferably 200° C. to 700° C., and more preferably 500° C. to 600° C.

Figure 3:
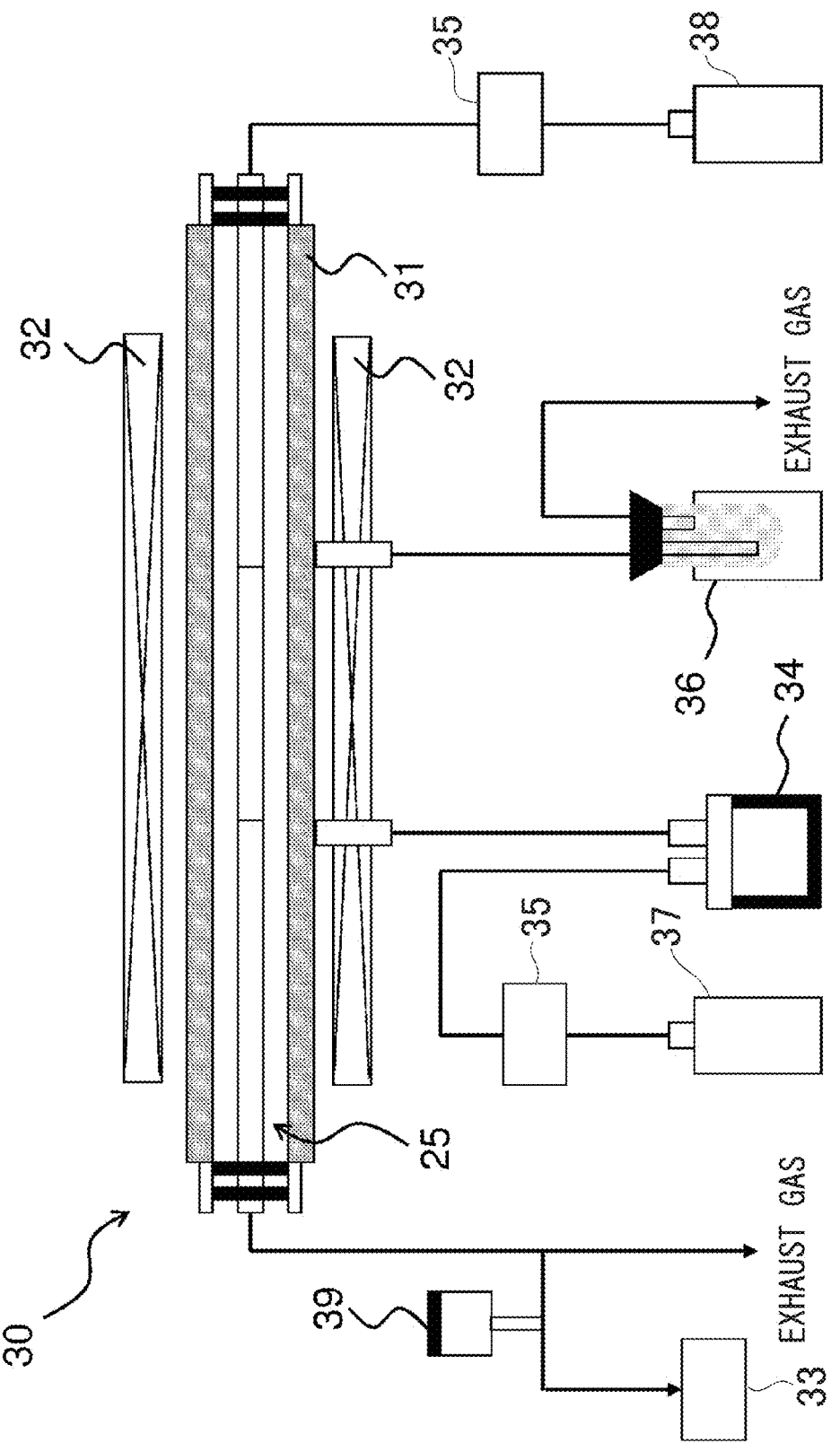
FIG. 3 is a schematic view showing a counter diffusion CVD apparatus.

For performing the silica membrane portion forming step, a counter diffusion CVD apparatus shown in FIG. 3 can be used. A detailed constitution of the counter diffusion CVD apparatus will be described later.

As shown in examples, which will be described later, the helium gas separator material of the present invention separates helium gas from mixed gas consisting of helium gas and other gases (gases having a molecular diameter larger than that of helium), under conditions of a gauge pressure exceeding 0.1 MPa and equal to or less than 12 MPa and preferably 0.9 MPa to 12 MPa and a high temperature of 150° C. to 300° C. Accordingly, the recovery rate of helium gas can be improved. Herein, the flow rate of the mixed gas is appropriately selected according to the size and the like of the helium gas separator material. For instance, the flow rate of the mixed gas can be set to 40 cc/min to 500 cc/min or the like per a membrane area of $4.7 \times 10^{-4}$ $m^2$.

EXAMPLES

Hereinafter, the present invention will be specifically described based on examples, but the present invention is not limited to the examples within a scope that does not depart from the gist of the present invention. Herein, in the following description, unless otherwise specified, "%" is based on mass.

A method for preparing a boehmite-based mixed solution used for forming a porous γ-alumina portion containing a Ni element will be described.

In a glove box in which an Ar gas atmosphere was created, 0.1 mol of isopropanol as a water-soluble organic solvent was added to 0.05 mol of aluminum tri-sec-butoxide, and the resultant was sufficiently mixed. Thereafter, the mixed solution was added to 90 ml of distilled water (5 mol) heated to 90° C. while being stirring. Subsequently, the solution was cooled to room temperature, and 5 mol % of $Ni(NO_3)_2 \cdot 6H_2O$ and 4.8 ml of 1 mol nitric acid were added thereto, followed by stirring, thereby obtaining a boehmite-based sol (molar ratio between Al and Ni expressed in terms of $Al_2O_3$ and NiO was 95:5) having a solid content concentration of 6.4%.

Next, 24 ml of the boehmite-based sol was mixed with 16 ml of a 3.5% aqueous polyvinyl alcohol solution, thereby preparing a boehmite-based mixed solution (sol composition).

Example 1

Figure 4:
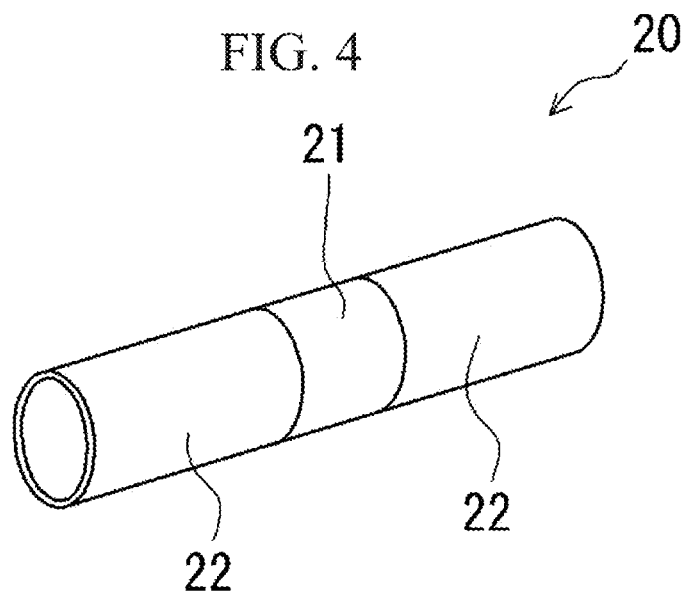
FIG. 4 is a schematic perspective view showing a composite substrate (including a porous α-alumina material) having not yet been used for the production of a helium gas separator material in examples.

As a material for a base portion, a porous tubular material (inner diameter of 2.1 mm, outer diameter of 2.9 mm, and a length of 400 mm), which was composed of α-alumina and had network-like pores (average pore diameter of 150 nm) making the inner wall communicate with the outer wall, was used. Herein, as shown in FIG. 4, in order to form the porous γ-alumina portion containing a Ni element in a portion 21 having a length of 50 mm in the central portion of the tubular material, the surface of portions 22 at both ends excluding the portion 21 was completely covered in advance with glass composed of Si—Ca—O. Hereinafter, the substrate of FIG. 4 will be referred to as a "first composite substrate 20".

The boehmite-based mixed solution (sol composition) was coated onto the outer surface of the first composite substrate 20 and dried for 1 hour. Herein, during the coating of the boehmite-based mixed solution, the solution was prevented from entering the pores of the central portion 21 of the porous tubular material. Thereafter, the resultant was thermally treated for 1 hour at 800° C. in the atmosphere, thereby forming a porous membrane, which was composed of γ-alumina and an oxide in the form of a solid solution containing Ni, on the whole surface of the first composite substrate 20 (surface of the central portion 21 and the portions 22 of both ends of the porous tubular material). The above operation was repeated again (membrane formation a total of two times), thereby obtaining a second composite structure (not shown in the drawing) including a porous composite portion having a porous membrane (porous γ-alumina portion including a Ni element) that covered the outer surface of the central portion 21 of the porous tubular material. Herein, as a result of measuring the thickness of the porous membrane (porous γ-alumina portion containing a Ni element) formed on the outer surface of the central portion 21 by a cross-sectional SEM method, the thickness was confirmed to be 3.0 μm.

Figure 5:
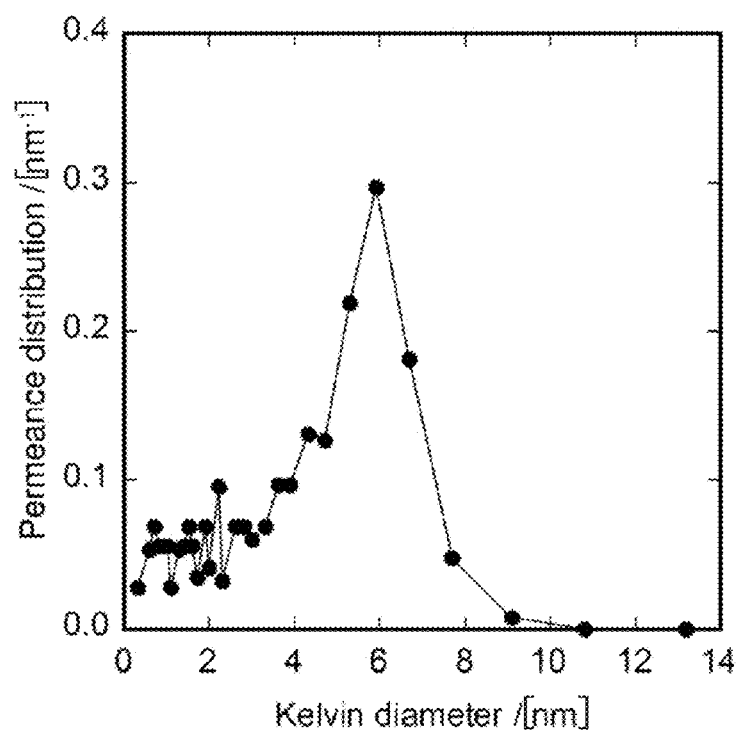
FIG. 5 is a graph showing the distribution of pore diameters of a porous γ-alumina portion formed on the surface of the composite substrate (porous α-alumina material) in Example 1.

The pore diameter distribution of the porous membrane (porous γ-alumina portion containing a Ni element) in the porous composite portion was measured by using a pore size distribution analyzer "Nano-Perm Porometer" manufactured by SEIKA CORPORATION. As a result, it was confirmed that the pore diameter ranged from 0.3 nm to 7.7 nm, and a 50% permeation flux diameter was about 5.9 nm (see FIG. 5).

Next, by using the counter diffusion CVD apparatus shown in FIG. 3, the second composite structure was disposed in a reactor; tetramethoxysilane gas (hereinafter, referred to as "TMOS gas") as silica precursor gas and oxygen gas as oxygen element-containing gas were introduced into the reactor; and under a heating condition using an electric furnace, a silica membrane was formed on the inner wall of the communication holes of the porous membrane in the porous composite portion. The details of the process are as follows.

A counter diffusion CVD apparatus 30 of FIG. 3 includes a reactor 31, an electric furnace 32, a rotary pump 33, a bubbler for TMOS 34, a mass flow controller (MFC) 35, a cold trap 36, a nitrogen gas cylinder 37, an oxygen gas cylinder 38, and the like. The pipe through which raw material gas passes is made of stainless steel, and a ribbon heater is coiled around the pipe so as to prevent condensation of the raw material gas in the pipe. Furthermore, before the apparatus is operated, both ends of the second composite structure were fixed by O-rings.

Figure 6:
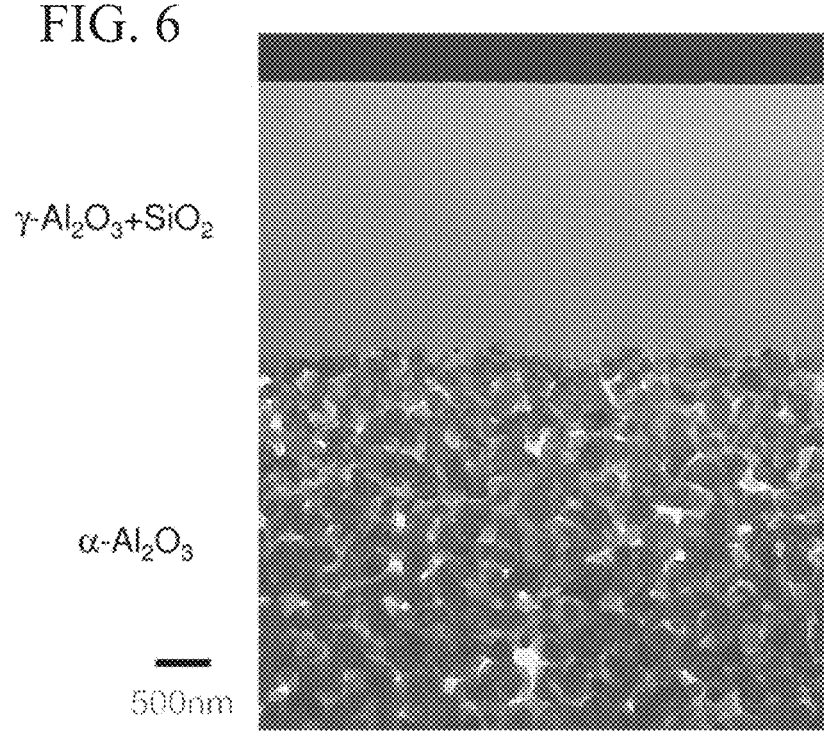
FIG. 6 is a TEM image showing the cross-section of a helium gas separator material obtained in Example 1.

First, by using the rotary pump 33, the internal pressure of the reactor 31 was reduced. Then by using the electric furnace 32, the internal temperature of the reactor 31 was increased to 600° C., and the oxygen gas and the TMOS gas were respectively supplied to the inside and outside (inside of the reactor 31) of the composite structure. All of the gases were supplied in an amount of 200 cc/min. Herein, in the bubbler 34, the TMOS heated to 45° C. was gasified by means of nitrogen gas bubbling. Subsequently, the pipe of the TMOS was heated to 70° C. This operation was performed for 2 hours. As a result, a silica membrane portion was formed, and the porous composite portion was taken as a helium gas separator material (see FIG. 6).

Figure 7:
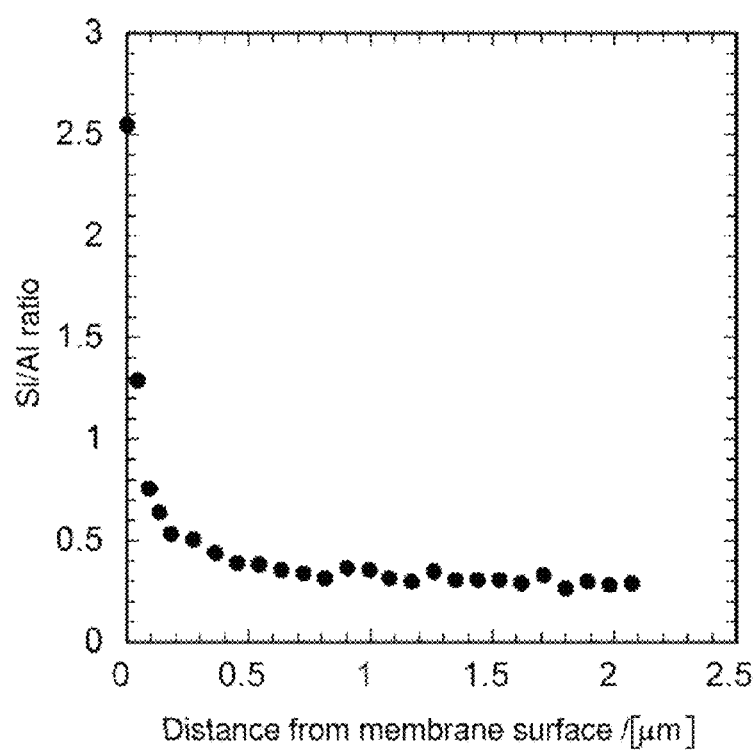
FIG. 7 is a graph showing the analysis results of a Si/Al ratio in the depth direction from the surface of a gas separation portion of the helium gas separator material obtained in Example 1.

Moreover, by using a transmission electron microscope "EM-002B" (model name) manufactured by TOPCON CORPORATION, elemental analysis was performed in the thickness direction of the helium gas separator material from the surface of the gas separation portion side. The Si/Al ratio is shown in FIG. 7. It was found that the silica membrane portion was positioned on the inner wall of the gas separation portion and was also formed at the surface side of the gas separation portion. Moreover, it was found that the length of the formed silica membrane portion in the thickness direction was about 200 nm.

Figure 8:
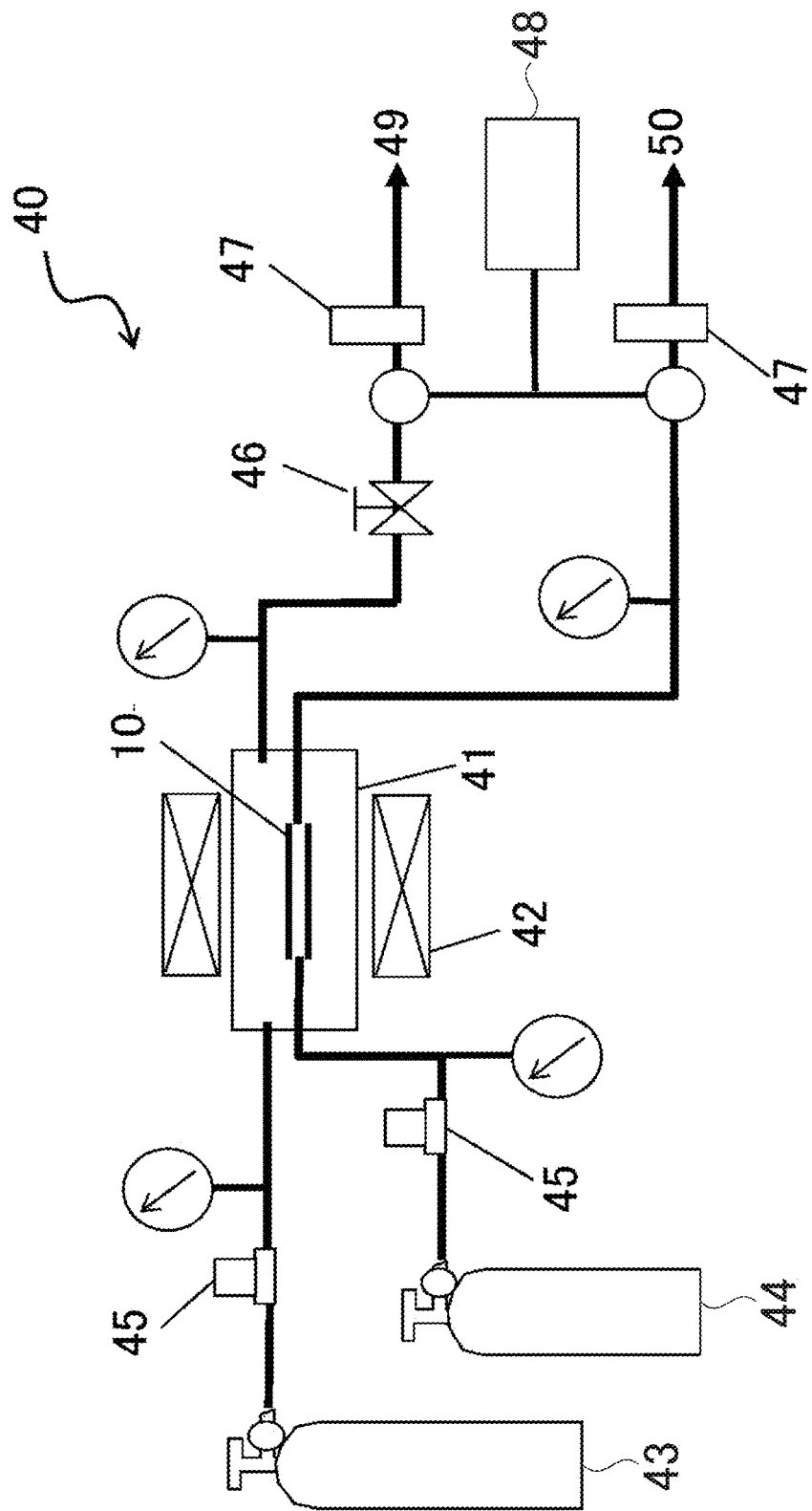
FIG. 8 is a schematic view showing an evaluation apparatus using a gas chromatograph method at constant pressure.

The gas permeability of the helium gas separator material was evaluated by a volume variation method at constant pressure (pressurization method) by using a gas permeability measurement apparatus shown in FIG. 8. As a measurement gas 43, methane gas containing 0.6% by volume of helium gas, that is, mixed gas composed of 99.4% by volume of methane gas and 0.6% by volume of helium gas was used.

Into a gas permeability measurement apparatus 40 of FIG. 8, the measurement gas 43 (mixed gas or the like) for separation was supplied at a high pressure; separation was performed in a gas separation chamber 41 by using the helium gas separator material 10; and then the separated gas was discharged at atmospheric pressure. After the helium gas separator material 10 was heated to a predetermined temperature by an electric furnace 42, a pressure regulator valve 46 was controlled in order to set a pressure difference to 0.1 MPa, 0.5 MPa, or 0.9 MPa. Subsequently, the measurement gas 43 was introduced into the gas separation chamber 41, the mixed gas (measurement gas 43) underwent separation by the helium gas separator material 10, and the composition of the separated gas (permeation gas and non-permeation gas) was analyzed by a gas chromatography apparatus 48. Herein, the flow rate of the measurement gas 43 introduced into the gas separation chamber 41 was set to 405 cc/min, 81 cc/min, or 40.5 cc/min (expressed in terms of methane) while being monitoring by a soap film flowmeter 47.

The flow rate of the separated gas introduced into a detector of the gas chromatography apparatus 48 was set to 20 cc/min. Although the non-permeation gas not treated by the helium gas separator material 10 could be introduced into the detector of the gas chromatography apparatus 48 at a sufficient flow rate, the flow rate of the permeation gas was less than 20 cc/min. Accordingly, at the time of gas separation, argon gas was supplied as a sweep gas 44 at a flow rate of 100 cc/min, such that the amount of the permeation gas introduced into the detector of the gas chromatography apparatus 48 became sufficient.

In the drawing, a sign 45 indicates a mass flow controller; a sign 49 indicates the non-permeation gas; and a sign 50 indicates the permeation gas.

(1) The temperature was set to 50° C., 100° C., 150° C., or 200° C.; the pressure difference was set to 0.1 MPa, 0.5 MPa, or 0.9 MPa; and the flow rate of the measurement gas used was set to 405 cc/min. At this time, the helium gas concentration of a non-permeation side was analyzed. The results are shown in Table 1.

TABLE 1

| Temperature (° C.) | Pressure difference (MPa) | Helium gas concentration of non-permeation side (%) |
|---|---|---|
| 50 | 0.1 | 0.60 |
| | 0.5 | 0.59 |
| | 0.9 | 0.58 |
| 100 | 0.1 | 0.58 |
| | 0.5 | 0.58 |
| | 0.9 | 0.56 |
| 150 | 0.1 | 0.58 |
| | 0.5 | 0.58 |
| | 0.9 | 0.57 |
| 200 | 0.1 | 0.59 |
| | 0.5 | 0.58 |
| | 0.9 | 0.58 |

From Table 1, it is found that the helium gas concentration of the non-permeation side decreases as the temperature of the helium gas separator material increases and the pressure difference increases.

(2) The temperature was set to 50° C., 100° C., or 200° C.; the pressure difference was set to 0.9 MPa; and the flow rate of the measurement gas used was set to 405 cc/min, 81 cc/min, or 40.5 cc/min. At this time, the helium gas concentration of the non-permeation side and the helium gas concentration at the permeation side were analyzed. The results are shown in Table 2.

TABLE 2

| Temperature (° C.) | Pressure difference (MPa) | Flow rate (cc/min) | Helium gas concentration of non-permeation side (%) | Helium gas concentration of permeation side (%) |
|---|---|---|---|---|
| 50 | 0.9 | 405 | 0.59 | 3.12 |
| | | 81 | 0.57 | 2.62 |
| | | 40.5 | 0.55 | 2.67 |

TABLE 2-continued

| Temperature (° C.) | Pressure difference (MPa) | Flow rate (cc/min) | Helium gas concentration of non-permeation side (%) | Helium gas concentration of permeation side (%) |
|---|---|---|---|---|
| 100 | 0.9 | 405 | 0.59 | 4.21 |
|  |  | 81 | 0.58 | 3.34 |
|  |  | 40.5 | 0.53 | 3.43 |
| 200 | 0.9 | 405 | 0.59 | 8.57 |
|  |  | 81 | 0.57 | 8.45 |
|  |  | 40.5 | 0.52 | 8.15 |

From Table 2, it was found that the helium gas concentration of the non-permeation side decreases as the temperature of the helium gas separator material increases and the flow rate of the measurement gas decreases. In contrast, it was found that although the helium gas concentration of the permeation side increases as the temperature of the helium gas separator material increases, it does not substantially vary with the flow rate of the measurement gas at the same temperature.

(3) The temperature was set to 200° C.; the pressure difference was set to 0.1 MPa, 0.5 MPa, or 0.9 MPa; and the flow rate of the measurement gas used was set to 405 cc/min, 81 cc/min, or 40.5 cc/min. At this time, the helium gas concentration of the non-permeation side and the helium gas concentration at the permeation side were analyzed. The results are shown in Table 3.

TABLE 3

| Temperature (° C.) | Pressure difference (MPa) | Flow rate (cc/min) | Helium gas concentration of non-permeation side (%) | Helium gas concentration of permeation side (%) |
|---|---|---|---|---|
| 200 | 0.1 | 405 | 0.58 | 2.01 |
|  |  | 81 | 0.58 | 2.36 |
|  |  | 40.5 | 0.57 | 2.36 |
| 200 | 0.5 | 405 | 0.59 | 5.79 |
|  |  | 81 | 0.58 | 5.02 |
|  |  | 40.5 | 0.55 | 5.79 |
| 200 | 0.9 | 405 | 0.59 | 8.57 |
|  |  | 81 | 0.57 | 8.45 |
|  |  | 40.5 | 0.52 | 8.15 |

From Table 3, it was found that the helium gas concentration of the permeation side increases as the pressure difference increases. Furthermore, it was found that at the same flow rate, the greater the pressure difference, the lower the helium gas concentration of the non-permeation side.

Figure 9:
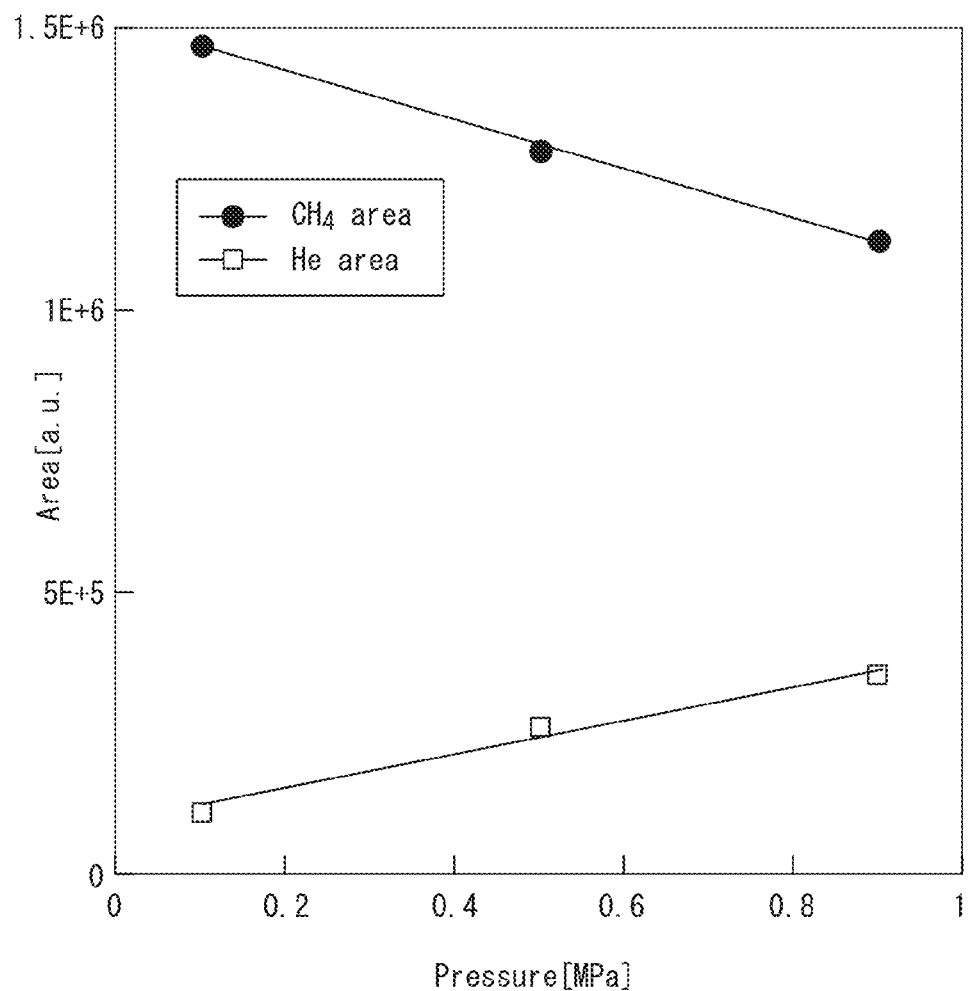
FIG. 9 is a graph showing a relationship established between a peak area of methane gas and helium gas in gas chromatography and a pressure at the time of gas separation when the volume variation method at constant pressure is applied to the helium gas separator material obtained in Example 1.

(4) The temperature was set to 200° C.; the pressure difference was set to 0.1 MPa, 0.5 MPa, or 0.9 MPa; and the flow rate of the measurement gas used was set to 40.5 cc/min. At this time, the helium gas concentration and the methane gas concentration of the permeation side were analyzed. FIG. 9 shows the relationship between each peak area and the pressure difference in gas chromatography. In FIG. 9, a white circle indicates the peak area of the helium gas, and a black circle indicates the peak area of the methane gas.

From FIG. 9, it was found that as the pressure difference increases, the amount of the permeating methane gas decreases, but the amount of the helium gas permeating tends to increase. From these results, it is assumed that under a high-pressure condition of a pressure higher than 0.9 MPa, the recovery rate of the helium gas contained in the measurement gas may further increase.

After the above evaluations (1) to (4) ended, the helium gas separator material tested and evaluated for 150 hours at 200° C. was observed. As a result, it was confirmed that the same membrane structure was maintained as before the evaluation.

INDUSTRIAL APPLICABILITY

If the helium gas separator material of the present invention is used for separating helium gas and other gases from mixed gas containing helium gas under a high-pressure condition in a range of a gauge pressure exceeding 0.1 MPa and equal to or less than 12 MPa, the helium gas is obtained at a high recovery rate. Accordingly, the helium gas separator material of the present invention is particularly suited for separating gas at a high pressure. Although the average diameter (0.27 nm to 0.60 nm) of the pores (fine pores) surrounded and formed by the silica membrane portion is greater than that of helium molecules in some areas, under the aforementioned pressure condition, helium gas preferentially permeates the pores before the gas having a molecular diameter greater than that of helium, such as carbon dioxide gas or nitrogen gas. For instance, such properties are suitably utilized to separate helium gas as a limited resource or crude helium gas (mixed gas containing helium gas as a main component and other small-diameter gases) from natural gas containing hydrocarbon gases useful as fuel gas and helium gas, and then return the helium gas or the crude helium gas into the ground or recovering it while preventing the gases from being naturally released into the atmosphere.

REFERENCE SIGNS LIST

10: helium gas separator material
11: base portion
12: gas separation portion
13: porous γ-alumina portion
14: silica membrane portion
15: pore
20: composite substrate
21: central portion of porous tubular material
22: portions of both ends of porous tubular material (portions covered with glass)
25: composite structure
30: counter diffusion CVD apparatus
31: reactor
32: electric furnace
33: rotary pump
34: bubbler
35: mass flow controller
36: cold trap
37: nitrogen gas cylinder
38: oxygen gas cylinder
39: pressure gauge
40: gas permeance measurement apparatus
41: gas separation chamber
42: electric furnace
43: measurement gas
44: sweep gas
45: mass flow controller
46: back pressure valve
47: soap film flowmeter
48: gas chromatography apparatus
49: non-permeation gas
50: permeation gas

The invention claimed is:

1. A helium gas separator material comprising:
a base portion; and
a gas separation portion joined to the base portion,
wherein the base portion is composed of a porous α-alumina material which has communication holes with an average diameter of 50 nm to 1,000 nm,
the gas separation portion has a porous γ-alumina portion containing a Ni element and a thickness of 1.0 μm to 6.0 μm and a silica membrane portion which is disposed on the inner wall of the communication holes in the porous γ-alumina portion containing a Ni element,
the average diameter of pores surrounded and formed by the silica membrane portion is 0.27 nm to 0.60 nm, and
wherein a length of the silica membrane portion in a depth direction from an exposed surface of the gas separation portion is 50 nm to 500 nm.

2. The helium gas separator material according to claim 1, wherein the helium gas separator material is used under a pressure condition in a range of a gauge pressure from greater than 0.1 MPa to less than 12 MPa.

3. The helium gas separator material according to claim 1, wherein the silica membrane portion is disposed at the exposed surface side of the gas separation portion in the inner wall of the communication holes of the porous γ-alumina portion.

4. A method for producing the helium gas separator material according to claim 1, comprising:
a coating film forming step of forming a coating film by using a composition, which contains an Al component-containing sol and a Ni compound, on the surface of the porous α-alumina material;
a thermal treatment step of heating the coating film so as to form a porous γ-alumina membrane containing a Ni element and obtain a complex in which the porous γ-alumina membrane is joined to the surface of the porous α-alumina material; and
a silica membrane portion forming step of supplying oxygen element-containing gas from the side of the porous α-alumina material to the side of the porous γ-alumina membrane through the communication holes in the complex in a state where silica precursor gas is present near the surface of the porous γ-alumina membrane in the complex and heating the complex, wherein in the silica membrane portion forming step, a volume ratio of the silica precursor gas is 20% by volume to 80% by volume and a volume ratio of the oxygen element-containing gas is 20% by volume to 80% by volume, wherein a total volume of the silica precursor gas and the oxygen element-containing gas is 100% by volume.

5. The method for producing the helium gas separator material according to claim 4, wherein the silica precursor gas is at least one kind selected from a group consisting of tetramethoxysilane, tetraethoxysilane, and hexamethyldisiloxane.

6. The method for producing the helium gas separator material according to claim 4, wherein the oxygen element-containing gas is oxygen gas or ozone gas.

7. A method for separating helium gas, comprising: a step of using the helium gas separator material according to claim 1 under a pressure condition in a range of a gauge pressure from greater than 0.1 MPa to 12 MPa so as to separate helium gas and other gases from a mixed gas containing helium gas.

8. The method for producing the helium separator gas material according to claim 4, wherein the porous γ-alumina portion is composed of a porous material in a mixed anionic state in which Ni is dissolved in a form of solid solution in a crystal structure of γ-$Al_2O_3$ with a low degree of crystallinity.

9. The method for producing the helium gas separator material according to claim 4, wherein the silica precursor gas is one or more gases selected from the group consisting of tetramethoxysilane, tetraethoxysilane, tetraethyl siloxane, and tetramethyl cyclotetrasiloxane.

* * * * *